US 10,870,786 B2

United States Patent
Iwata

(10) Patent No.: US 10,870,786 B2
(45) Date of Patent: Dec. 22, 2020

(54) LOW HEAT RESISTANCE SILICONE COMPOSITION

(71) Applicant: SHIN-ETSU CHEMICAL CO., LTD., Tokyo (JP)

(72) Inventor: Mitsuhiro Iwata, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 22 days.

(21) Appl. No.: 16/427,137

(22) Filed: May 30, 2019

(65) Prior Publication Data

US 2019/0367792 A1 Dec. 5, 2019

(30) Foreign Application Priority Data

May 31, 2018 (JP) .................. 2018-104399

(51) Int. Cl.
- C08L 83/04 (2006.01)
- C08K 3/22 (2006.01)
- C09K 5/14 (2006.01)
- H01B 3/46 (2006.01)

(52) U.S. Cl.
CPC ............. C09K 5/14 (2013.01); C08L 83/04 (2013.01); H01B 3/465 (2013.01); C08L 2203/20 (2013.01); C08L 2205/025 (2013.01)

(58) Field of Classification Search
CPC ............................................ C08K 2003/2227
USPC ................................. 524/430, 588
See application file for complete search history.

(56) References Cited

U.S. PATENT DOCUMENTS

| | | | |
|---|---|---|---|
| 3,885,984 A | 5/1975 | Wright | |
| 4,265,775 A | 5/1981 | Aakalu et al. | |
| 5,011,870 A | 6/1991 | Peterson | |
| 5,981,641 A | 11/1999 | Takahashi et al. | |
| 6,165,437 A * | 12/2000 | Mohri | C01F 7/02 |
| | | | 423/625 |
| 7,291,671 B2 * | 11/2007 | Fukui | C08L 83/04 |
| | | | 524/588 |
| 8,017,684 B2 | 9/2011 | Endo et al. | |
| 2002/0018885 A1 | 2/2002 | Takahashi et al. | |
| 2004/0254275 A1 | 12/2004 | Fukui et al. | |
| 2005/0261140 A1 * | 11/2005 | Yamada | C10M 111/04 |
| | | | 508/150 |
| 2007/0149834 A1 * | 6/2007 | Endo | C10M 169/02 |
| | | | 585/7 |
| 2008/0269084 A1 * | 10/2008 | Matsumoto | H01L 23/3737 |
| | | | 508/136 |
| 2010/0220446 A1 * | 9/2010 | Tabei | C08L 83/04 |
| | | | 361/707 |
| 2011/0188213 A1 * | 8/2011 | Domae | C08L 83/04 |
| | | | 361/748 |
| 2018/0127629 A1 * | 5/2018 | Takanashi | C08K 3/22 |

FOREIGN PATENT DOCUMENTS

| | | |
|---|---|---|
| JP | S52-33272 B2 | 8/1977 |
| JP | S56-28264 A | 3/1981 |
| JP | S59-52195 B2 | 12/1984 |
| JP | S61-157587 A | 7/1986 |
| JP | H02-153995 A | 6/1990 |
| JP | H03-14873 A | 1/1991 |
| JP | H10-110179 A | 4/1998 |
| JP | 2000-063872 A | 2/2000 |
| JP | 2000-063873 A | 2/2000 |
| JP | 2002-030217 A | 1/2002 |
| JP | WO2002/092693 A1 | 8/2004 |
| JP | 2004-262972 A | 9/2004 |
| JP | 2005-162975 A | 6/2005 |
| JP | 4933094 B2 | 5/2012 |
| JP | 5755977 B2 | 7/2015 |

OTHER PUBLICATIONS

Extended European Search Report dated Oct. 18, 2019, in European Patent Application No. 19176535.3.

* cited by examiner

Primary Examiner — Marc S Zimmer
(74) Attorney, Agent, or Firm — Birch, Stewart, Kolasch & Birch, LLP

(57) ABSTRACT

A low heat resistance silicone composition, including: (A) an organopolysiloxane having a specific kinematic viscosity; (B) an organopolysiloxane having a specific kinematic viscosity; (C) an α-aluminum oxide powder, α-aluminum oxide having a specific crystal structure and a particle shape with a D/H ratio in the predetermined range when a maximum particle diameter parallel to a hexagonal lattice face of the hexagonal close-packed lattice is taken as D and a particle diameter perpendicular to the hexagonal lattice face is taken as H, and the α-aluminum oxide powder having a specific average particle diameter, a specific content of coarse particles, and a specific purity; and (D) a spherical and/or irregular-shaped zinc oxide powder having a specific average particle diameter, and a specific content of coarse particles, in which the low heat resistance silicone composition has a specific heat conductivity and a specific viscosity.

7 Claims, No Drawings

LOW HEAT RESISTANCE SILICONE COMPOSITION

CROSS-REFERENCE TO RELATED APPLICATION

This non-provisional application claims priority under 35 U.S.C. § 119(a) on Patent Application No. 2018-104399 filed in Japan on May 31, 2018, the entire contents of which are hereby incorporated by reference.

TECHNICAL FIELD

The present invention relates to a low heat resistance silicone composition which maintains fluidity and favorable handleability, and further is excellent in the durability and reliability under the condition of high temperature or high temperature/high humidity, even though a heat conductive filler is highly filled therein in order to impart excellent insulation and heat conductivity to the low heat resistance silicone composition.

BACKGROUND ART

Since many of electronic components generate heat during the use, such heat is required to be removed from the electronic components in order to make the electronic components function appropriately. In particular, in an integrated circuit device such as a central processing unit (CPU) used in a personal computer, the calorific value is increased due to the speeding-up of operation frequency, and a countermeasure against the heat has become a serious problem.

Many methods have been proposed as a means for removing the heat. In particular, for an electronic component having a high calorific value, Patent Documents 1 and 2 propose a method in which heat is released by interposing a heat conductive material such as a heat conductive grease composition or a heat conductive sheet between the electronic component and a member such as a heat sink. However, it has not been satisfactory for the heat release particularly in the part where the specification thickness greatly differs.

As such a heat conductive material, Patent Documents 3 and 4 propose a heat releasing grease composition in which a silicone oil is used as a base and zinc oxide or alumina powder is mixed. However, the composition has been unsatisfactory for the heat resistance at 200° C.

In order to improve the heat conductivity, Patent Document 1 discloses, as a heat conductive material using an aluminum nitride powder, a thixotropic heat conductive material containing a liquid organosilicone carrier, silica fiber, and at least one kind of filler selected from among dendritic zinc oxide, lamellar aluminum nitride and lamellar boron nitride. Patent Document 5 discloses a silicone grease composition obtained by mixing a spherical hexagonal aluminum nitride powder having a certain particle diameter range with a specific organopolysiloxane. Patent Document 6 discloses a heat conductive silicone grease composition in which an aluminum nitride powder having a fine particle diameter and an aluminum nitride powder having a coarse particle diameter are added in combination. Patent Document 7 discloses a heat conductive silicone grease composition in which an aluminum nitride powder is added in combination of a zinc oxide powder. Patent Document 8 discloses a heat conductive grease composition in which an aluminum nitride powder which has been surface-treated with an organosilane is used. However, those compositions have been unsatisfactory from the viewpoint of the durability and the reliability in any case. Patent Document 9 discloses a heat conductive silicone composition containing a silicone resin, diamond, zinc oxide, and a dispersant. However, the composition has been unsatisfactory particularly for the characteristics after heat resistance. It is noted that aluminum nitride has a heat conductivity of 70 to 270 W/(m·K), and diamond has a heat conductivity higher than that of the aluminum nitride, which is 900 to 2,000 W/(m·K).

In addition, a metal has a high heat conductivity, and can be used in a part where an electronic component is not required to be insulated. Patent Document 10 discloses a heat conductive grease composition obtained by mixing a metal aluminum powder with a base oil such as a silicone oil. However, the composition has been unsatisfactory because of having no insulation.

Further, any of the heat conductive materials and the heat conductive grease compositions has been insufficient recently for the calorific value of an integrated circuit device such as a CPU.

As is clear from the theoretical equation of Maxwell and Bruggeman, the heat conductivity of a material obtained by mixing a heat conductive filler with a silicone oil is almost independent of the heat conductivity of the heat conductive filler when the volume fraction of the heat conductive filler is 0.6 or less. The heat conductivity of the heat conductive filler is affected for the first time when the volume fraction exceeds 0.6. That is, in order to increase the heat conductivity of a heat conductive grease composition, it is important at first how to highly fill the composition with a heat conductive filler, and further it is important how a filler having a high heat conductivity can be used for the composition. However, the fluidity of the heat conductive grease composition is decreased due to the high filling, the workability such as a coating property e.g. a dispensing property, and a screen printing property is deteriorated. As a result, a problem of not being able to be used practically has been occurred. Moreover, due to the decrease of the fluidity, the heat conductive grease composition cannot conform to the fine unevenness on a surface of an electronic component or a heat sink. As a result, a problem that the contact heat resistance is increased has been generated.

So far, for the purpose of obtaining a heat conductive material which is capable of achieving the high filling and has favorable fluidity, it has also been studied to mix an alkoxy group-containing organopolysiloxane for treating a surface of a heat conductive filler to improve the dispersibility, with the heat conductive material. For example, see Patent Documents 11 and 12. However, there has been a drawback that such a treatment agent is degraded by hydrolysis or the like under high temperature and high humidity, and induces the performance deterioration of the heat conductive material.

In view of this, Patent Document 13 proposes a heat conductive silicone grease composition with which the performance deterioration of a heat conductive material is suppressed even under high temperature and high humidity. In this proposal, however, the average particle diameter of a heat conductive filler is defined, but the shape of the heat conductive filler, the hydroxyl content, and coarse particles are not defined. It has not been satisfactory, particularly for the application which requires insulation.

Patent Document 14 discloses a high heat conductive resin composition containing a spherical aluminum oxide powder which is defined by having a specific average sphericity, a specific hydroxyl content, and an average particle diameter of 10 to 50 μm, and an aluminum oxide powder which is defined by having an average particle diameter of 0.3 to 1 μm are mixed, and the mixing ratio and volume ratio of each of the aluminum oxides are defined. However, although there is a description that the average particle diameter of the spherical aluminum oxide powder is 50 μm at the maximum, there are no definitions of the range of the diameter and the content of coarse particles. There also has been a problem of insufficient heat resistance when a high heat conductive resin composition is tried to be applied to a thin film of 50 μm or less.

Although Patent Document 15 discloses a heat conductive silicone composition containing an alumina powder having an average particle diameter of 0.1 to 100 μm, there are no definitions of the specific heat conductivity and the viscosity. Further, Patent Document 15 may use a mixture of a spherical alumina powder having an average particle diameter of 5 to 50 μm (excluding 5 μm) and a spherical or irregular-shaped alumina powder having an average particle diameter of 0.1 to 5 μm. However, although a heat conductive silicone composition in which the mixing ratio and weight ratio of each of the aluminum oxides are defined have been proposed, there are no definitions of the average sphericity and the hydroxyl content of the spherical alumina having a large average particle diameter, there are also no definitions of the diameter range and the content of coarse particles. Therefore, there has been a problem of insufficient heat resistance as is the case with Patent Document 14.

CITATION LIST

Patent Document 1: JP-A S56-28264
Patent Document 2: JP-A S61-157587
Patent Document 3: JP-B S52-33272
Patent Document 4: JP-B S59-52195
Patent Document 5: JP-A H02-153995
Patent Document 6: JP-A H03-14873
Patent Document 7: JP-A H10-110179
Patent Document 8: JP-A 2000-63872
Patent Document 9: JP-A 2002-30217
Patent Document 10: JP-A 2000-63873
Patent Document 11: JP-A 2004-262972
Patent Document 12: JP-A 2005-162975
Patent Document 13: JP-B2 4933094
Patent Document 14: JP-B2 5755977
Patent Document 15: Re-published No. 2002-092693

SUMMARY OF THE INVENTION

An object of the invention is to provide a low heat resistance silicone composition which has insulation and high heat conductivity, further maintains excellent fluidity, and thus has favorable workability, and further conforms to fine unevenness on a surface of electronic components, heat sinks and the like, decreases contact heat resistance, and thus is excellent in the heat release performance. Another object of the present invention is to increase the durability under the condition of high temperature or high temperature and high humidity and to improve the reliability during the implementation, of the low heat resistance silicone composition being excellent in the heat radiation performance and the workability.

The inventors have found that a low heat resistance silicone composition shown below, which contains α-aluminum oxide having a polyhedral shape with a defined average particle diameter and a defined content of coarse particles, has excellent insulation and heat conductivity, and further has favorable fluidity, and as a result, the low heat resistance silicone composition can reduce the contact heat resistance, and exerts an excellent heat release effect, and further the low heat resistance silicone composition is also extremely excellent in the durability under high temperature or high temperature and high humidity.

In one aspect, the invention provides a low heat resistance silicone composition, comprising:

(A) 5 to 99 parts by weight of an organopolysiloxane having a kinematic viscosity at 25° C. of 10 to 10,000 mm²/s and represented by the following general formula (1):

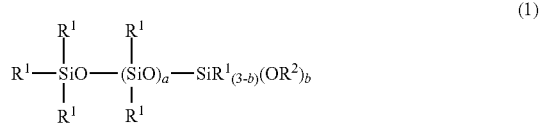

(1)

wherein $R^1$ is each independently an unsubstituted or substituted monovalent hydrocarbon group having 1 to 18 carbon atoms, $R^2$ is each independently alkyl, alkoxyalkyl, alkenyl, or acyl, a is an integer of 5 to 100, and b is an integer of 1 to 3;

(B) 95 to 1 part by weight of an organopolysiloxane having a kinematic viscosity at 25° C. of 10 to 100,000 mm²/s and represented by the following general formula (2):

(2)

wherein $R^3$ is each independently an unsubstituted or substituted monovalent hydrocarbon group having 1 to 18 carbon atoms, and c is a number of 1.8 to 2.2, provided that the total amount of components (A) and (B) combined is 100 parts by weight;

(C) an α-aluminum oxide powder, the α-aluminum oxide having a crystal structure of a hexagonal close-packed lattice which is formed of a polyhedron with 8 or more faces, and a particle shape with a D/H ratio of 0.3 to 30 when a maximum particle diameter parallel to a hexagonal lattice face of the hexagonal close-packed lattice is taken as D and a particle diameter perpendicular to the hexagonal lattice face is taken as H, and the α-aluminum oxide powder having an average particle diameter of 0.3 to 5 μm, a content ratio of coarse particles with 10 μm or more in a laser diffraction-type particle size distribution of 1% by weight or less of the entire component (C), and a purity of 99% or more; and (D) a spherical and/or irregular-shaped zinc oxide powder having an average particle diameter of 0.01 μm or more and less than 3 μm, and a content ratio of coarse particles with 10 μm or more in a laser diffraction-type particle size distribution of 1% by weight or less of the entire component (D), provided that a weight ratio of component (C) and component (D) is 5/5 to 9.5/0.5, and the total amount of components (C) and (D) combined is 65 to 80% by volume of the entire composition, the composition having a heat conductivity of 2 W/m·K or more and less than 4 W/m·K as measured by a hot disk method in accordance with ISO 22007-2, and a viscosity at 25° C. of 5 to 800 Pa·s as measured by a spiral viscometer at a rotation speed of 10 rpm.

Preferably, the low heat resistance silicone composition has a heat resistance at 25° C. as measured by a laser flash method of 6 mm²·K/W or less.

Preferably, the low heat resistance silicone composition has a heat resistance at 25° C. as measured by a laser flash method of 6 mm²·K/W or less after the composition is left to stand for 96 hours under an atmosphere of 130° C./85% RH.

Preferably, the low heat resistance silicone composition has a viscosity at 25° C. of 1,000 Pa·s or less as measured by a spiral viscometer at a rotation speed of 10 rpm after the composition is heat-deteriorated at 200° C. for 100 hours.

Preferably, the low heat resistance silicone composition further comprises component (E) of a volatile solvent capable of dispersing or dissolving components (A) and (B) in the solvent, in an amount of 100 parts by weight or less per 100 parts by weight of the total amount of components (A) and (B) combined.

Preferably, the low heat resistance silicone composition further comprises:

(F) an alkoxysilane represented by the following general formula (3):

$$R^4_d R^5_e Si(OR^6)_{4-d-e} \quad (3)$$

wherein $R^4$ is each independently an alkyl group having 9 to 15 carbon atoms, $R^5$ is each independently an unsubstituted or substituted monovalent hydrocarbon group having 1 to 8 carbon atoms, $R^6$ is each independently an alkyl group having 1 to 6 carbon atoms, d is an integer of 1 to 3, and e is an integer of 0 to 2, provided that d+e is an integer of 1 to 3, in an amount of 0.1 to 50 parts by weight per 100 parts by weight of the total amount of components (A) and (B) combined, wherein components (C) and (D) are surface-treated with component (F).

Preferably, the low heat resistance silicone composition has a volume resistivity of $1\times10^9$ Ω·cm or more.

Advantageous Effects of the Invention

The low heat resistance silicone composition according to the present invention has favorable heat conductivity while having insulation, further maintains favorable fluidity, and thus is excellent in the workability. Further, the low heat resistance silicone composition is also excellent in the adhesion with a heat generating electronic component and a heat releasing component, and therefore, the contact heat resistance can be reduced. That is, by interposing the low heat resistance silicone composition according to the present invention between a heat generating electronic component and a heat releasing component, the heat generated from the heat generating electronic component can be efficiently dissipated to the heat releasing component. In addition, the low heat resistance silicone composition according to the present invention is also excellent in the durability under high temperature or high temperature and high humidity, and for example, when used for the heat release of a general power source, an electronic device, or the like, or for the heat release of an integrated circuit device such as large scale integration (LSI) and a CPU to be used for an electronic device such as a personal computer, or a digital video disk drive, the low heat resistance silicone composition can impart extremely favorable reliability to them. Accordingly, the low heat resistance silicone composition according to the present invention can drastically improve the stability and the lifetime of a heat generating electronic component, an electronic device using the heat generating electronic component, or the like.

DESCRIPTION OF THE PREFERRED EMBODIMENT

The low heat resistance silicone composition according to the present invention contains (A) an organopolysiloxane represented by the following formula (1), (B) an organopolysiloxane represented by the following formula (2), (C) a specific aluminum oxide powder, and (D) a specific zinc oxide powder, and has a specific heat conductivity and a specific viscosity.

Component (A)

Component (A) is an organopolysiloxane having a kinematic viscosity at 25° C. of 10 to 10,000 mm²/s, which is represented by the following formula (1),

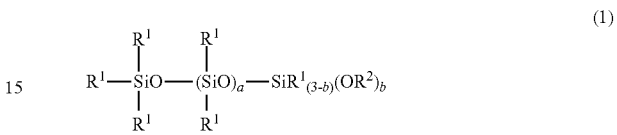

wherein $R^1$ is each independently an unsubstituted or substituted monovalent hydrocarbon group having 1 to 18 carbon atoms, $R^2$ is each independently alkyl, alkoxyalkyl, alkenyl, or acyl, a is an integer of 5 to 100, and b is an integer of 1 to 3.

Even if heat conductive fillers of component (C) and component (D) described below are highly filled in the composition of the present invention in order to obtain a low heat resistance silicone composition, component (A) maintains the fluidity of the composition, and imparts favorable handleability to the composition. As to component (A), one kind may be used alone, or two or more kinds may be used in combination.

$R^1$ is each independently an unsubstituted or substituted monovalent hydrocarbon group having 1 to 18 carbon atoms and particularly having 1 to 10 carbon atoms.

Examples of $R^1$ include linear, branched or cyclic alkyl groups, alkenyl groups, aryl groups, aralkyl groups, and halogenated alkyl groups. Examples of the linear alkyl groups include methyl, ethyl, propyl, hexyl, and octyl. Examples of the branched alkyl groups include isopropyl, isobutyl, tert-butyl, and 2-ethylhexyl. Examples of the cyclic alkyl groups include cyclopentyl and cyclohexyl. Examples of the alkenyl groups include vinyl and allyl. Examples of the aryl groups include phenyl and tolyl. Examples of the aralkyl groups include 2-phenylethyl and 2-methyl-2-phenylethyl. Examples of the halogenated alkyl groups include 3,3,3-trifluoropropyl, 2-(nonafluorobutyl)ethyl, and 2-(heptadecafluorooctyl) ethyl. $R^1$ is preferably methyl or phenyl.

$R^2$ is each independently alkyl groups, alkoxyalkyl groups, alkenyl groups, or acyl groups, which have 1 to 18 carbon atoms and particularly 1 to 10 carbon atoms, and examples of alkyl groups include linear, branched or cyclic alkyl groups, which are similar to those as are mentioned for $R^1$. Examples of alkenyl groups include alkenyl groups similar to those as are mentioned for $R^1$. Examples of alkoxyalkyl groups include methoxyethyl and methoxypropyl. Examples of acyl groups include acetyl and octanoyl. $R^2$ is preferably alkyl groups, and more preferably methyl or ethyl.

The subscript "a" is an integer of 5 to 100, preferably an integer of 5 to 50, and more preferably an integer of 5 to 30. The subscript "b" is an integer of 1 to 3, and preferably 3.

The kinematic viscosity at 25° C. of component (A) is 10 to 10,000 mm²/s, and preferably 10 to 5,000 mm²/s. If the kinematic viscosity is lower than 10 mm²/s, oil bleeding is caused from the resulting low heat resistance silicone composition. If the kinematic viscosity is larger than 10,000 mm²/s, the fluidity of the resulting low heat resistance silicone composition becomes poor. It is noted that in the present invention, the kinematic viscosity of component (A) is a value obtained at 25° C. with an Ostwald viscometer.

The amount of component (A) to be added in the composition of the present invention is in the range of 5 to 99 parts by weight, and preferably in the range of 15 to 85 parts by weight, provided that the total amount of component (A) and component (B) described later is 100 parts by weight. If the amount to be added is within the range, the composition of the present invention is easy to maintain the favorable fluidity, and the workability, and heat conductive fillers of components (C) and (D) that are described later are easy to be highly filled in the composition.

Further, if component (A) is less than 5 parts by weight, the heat conductive fillers of components (C) and (D) cannot be highly filled in the composition. If component (A) exceeds 99 parts by weight, oil bleeding of component (A) is caused with the lapse of time.

Specific non-limiting examples of component (A) are shown below.

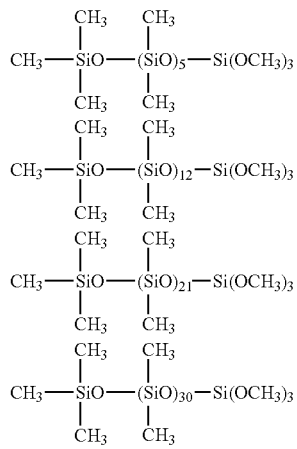

Component (B)

Component (B) is an organopolysiloxane having a kinematic viscosity at 25° C. of 10 to 100,000 mm²/s and represented by the following average composition formula (2):

$$R^3_c SiO_{(4-c)/2} \quad (2)$$

wherein $R^3$ is each independently an unsubstituted or substituted monovalent hydrocarbon group having 1 to 18 carbon atoms, and c is a number of 1.8 to 2.2.

Component (B) is used for the purpose of the impartment of the properties of a viscosity modifier, an adhesiveness imparting agent, or the like of the low heat resistance silicone composition according to the present invention. As component (B), one kind may be used alone, or two or more kinds may be used in combination.

$R^3$ is each independently an unsubstituted or substituted monovalent hydrocarbon group having 1 to 18 carbon atoms and particularly having 1 to 10 carbon atoms. Examples of $R^3$ include alkyl groups such as methyl, ethyl, propyl, hexyl, octyl, decyl, dodecyl, tetradecyl, hexadecyl, and octadecyl; cycloalkyl groups such as cyclopentyl and cyclohexyl; alkenyl groups such as vinyl and allyl; aryl groups such as phenyl and tolyl; aralkyl groups such as 2-phenylethyl and 2-methyl-2-phenylethyl; and halogenated hydrocarbon groups such as 3,3,3-trifluoropropyl, 2-(perfluorobutyl) ethyl, 2-(perfluorooctyl)ethyl, and p-chlorophenyl. As $R^3$, in particular, methyl, phenyl, or alkyl groups having 6 to 18 carbon atoms are preferred, and methyl or phenyl is more preferred.

From the viewpoint of the consistency required for the composition of the present invention as a low heat resistance silicone composition, the subscript "c" is a number of 1.8 to 2.2, and more preferably a number of 1.9 to 2.1.

Component (B) has a kinematic viscosity at 25° C. of preferably 10 to 100,000 mm²/s, and more preferably 10 to 10,000 mm²/s. If the kinematic viscosity is lower than 10 mm²/s, liquid separation or oil bleeding is caused from the low heat resistance silicone composition to be obtained. If the kinematic viscosity is larger than 100,000 mm²/s, the fluidity of the resulting low heat resistance silicone composition becomes poor, and therefore, a problem of deteriorating the workability is caused. It is noted that the kinematic viscosity of component (B) is also a value measured with an Ostwald viscometer at 25° C.

Illustrative non-limiting examples of component (B) are shown below.

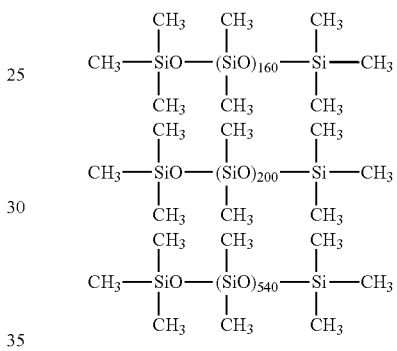

The amount of component (B) to be added in the composition of the present invention is in the range of 1 to 95 parts by weight, and preferably in the range of 15 to 85 parts by weight, provided that the total amount of the above-described component (A) and component (B) is 100 parts by weight. If the amount to be added is within the range, the composition of the present invention is easy to maintain the favorable fluidity, and the workability, and heat conductive fillers of components (C) and (D) described later are easy to be highly filled in the composition. If component (B) is less than 1 part by weight, oil bleeding of component (A) is caused with the lapse of time. If component (B) exceeds 95 parts by weight, the heat conductive fillers of components (C) and (D) cannot be highly filled in the composition.

Component (C)

Component (C) used in the present invention is an α-aluminum oxide powder. The α-aluminum oxide has a crystal structure of a hexagonal close-packed lattice which is formed of a polyhedron with 8 or more faces, and a particle shape with a D/H ratio of 0.3 to 30 when a maximum particle diameter parallel to a hexagonal lattice face of the hexagonal close-packed lattice is taken as D and a particle diameter perpendicular to the hexagonal lattice face is taken as H, and the α-aluminum oxide powder has an average particle diameter of 0.3 to 5 m, a content ratio of coarse particles with 10 μm or more in a laser diffraction-type particle size distribution of 1% by weight or less of the entire component (C), and a purity of 99% or more.

As to the α-aluminum oxide of component (C), the structure is a hexagonal close-packed lattice crystal structure that is formed of a polyhedron with 8 or more faces and preferably formed of a polyhedron with 8 faces to 20 faces, and an α-aluminum oxide having a crystal structure substantially formed of a polyhedron with 8 faces and/or 16 faces is preferred. The crystal structure can be confirmed by the following image diffractometer.

The shape of the particles of component (C) in the present invention has a D/H ratio in the range of 0.3 or more and 30 or less when a maximum particle diameter parallel to a hexagonal lattice face of the α-aluminum oxide powder having a hexagonal close-packed lattice structure is taken as D, and a particle diameter perpendicular to the hexagonal lattice face is taken as H. The D/H ratio can be measured by taking the image of the particle photographed with a scanning electron microscope into an image analyzer, for example, "JSM-7500F" (trade name) manufactured by JEOL Ltd., and by performing as follows. That is, the measurement is performed by taking a maximum particle diameter parallel to a hexagonal lattice face of the picture from a photograph as D and by taking a particle diameter perpendicular to the hexagonal lattice face as H. The D/H ratio of each of the arbitrary 10 particles thus measured is calculated, and the average value is taken as D/H. In the present invention, the D/H ratio is preferably in the range of 0.3 to 5.

If the D/H ratio of component (C) is less than 0.3, the filling property to a resin is deteriorated, the contact between particles is reduced, the contact heat resistance between particles is increased, and the heat resistance becomes high. Further, if the D/H ratio of component (C) exceeds 30, the contact between the particles becomes remarkable, and the unevenness on a surface of the composition becomes large, as a result of which, the interface heat resistance is increased, and the heat resistance becomes high.

The average particle diameter (primary particle diameter and/or secondary particle diameter) of component (C) is 0.3 to 5 μm and preferably 0.4 to 4 μm on a volume basis. If the average particle diameter is within the range, the bulk density of component (C) is easily increased, and the specific surface area is easily decreased, and therefore, component (C) is easily filled highly in the low heat resistance silicone composition according to the present invention. If the average particle diameter is smaller than 0.3 μm, the filling property to a resin is deteriorated, and the viscosity becomes significantly high. On the other hand, if the average particle diameter is 5 μm or more, which is extremely large, oil separation may be facilitated, and therefore, the heat resistance is deteriorated with the lapse of time.

If the content ratio of coarse particles with 10 μm or more in a laser diffraction-type particle size distribution is 1% by weight or less of the entire component (C), component (C) can achieve both of the desired heat resistance and high heat conductivity. On the other hand, if the content ratio of coarse particles with 10 μm or more exceeds 1% by weight of the entire component (C), the thickness may not become 20 μm or less, and further, a tendency that the desired heat resistance cannot be achieved is generated. The content ratio of such coarse particles is preferably 0.5% by weight or less of the entire component (C).

It is noted that the average particle diameter on a volume basis of component (C) in the present invention can be measured, for example, by using a "laser diffraction particle size analyzer SALD-2300" manufactured by Shimadzu Corporation. As an evaluation sample, 50 cc of pure water and 5 g of a heat conductive powder to be measured are add in a glass beaker, and stirred with a spatula, and then the obtained minute is subjected to a dispersion treatment for 10 minutes with an ultrasonic washing machine. The solution of the powder of the heat conductive material, to which the dispersion treatment has been performed, is added drop by drop with a dropper onto a sampler part of an analyzer, and is left to stand so as to be stabilized until the absorbance becomes measurable. In this way, the measurement is performed when the absorbance is stabilized. With a laser diffraction particle size analyzer, a particle size distribution is calculated from the data of light intensity distribution of diffraction/scattering light by the particles detected by a sensor. The average particle diameter is determined by multiplying the value of the particle diameter to be measured by the relative particle amount (difference %) and dividing by the total (100%) of the relative particle amounts. It is noted that the average particle diameter is an average diameter of particles. For example, the content ratio of coarse particles of 10 μm or more of component (C) can also be easily confirmed from the entire particle size distribution.

The purity of component (C) is 99% or more, and preferably 99.5% or more. If the purity is lower than this, the heat resistance tends to become high. In the present invention, the purity of component (C) is a value measured by atomic absorption spectrophotometry in accordance with JIS K 1410.

As long as the α-aluminum oxide has a crystal structure of a hexagonal close-packed lattice which is formed of a polyhedron with 8 or more faces, and a particle shape with a D/H ratio of 0.3 to 30 when a maximum particle diameter parallel to a hexagonal lattice face of the hexagonal close-packed lattice is taken as D and a particle diameter perpendicular to the hexagonal lattice face is taken as H, and the α-aluminum oxide powder has an average particle diameter of 0.3 to 5 μm, a content ratio of coarse particles with 10 μm or more in a laser diffraction-type particle size distribution of 1% by weight or less of the entire component (C), and a purity of 99% or more, one kind of the α-aluminum oxide powder may be used alone, or two or more kinds of the multiple kinds having a different average particle diameter from each other may be used in combination within the range of not impairing the effects of the present invention. The mixing ratio of component (C) is described later.

Component (D)

Component (D) is a spherical and/or irregular-shaped zinc oxide powder having an average particle diameter of 0.01 μm or more and less than. 3 μm, and having a content ratio of coarse particles with 10 μm or more in a laser diffraction-type particle size distribution of 1% by weight or less of the entire component.

The zinc oxide powder of component (D) functions as a heat conductive filler in the low heat resistance silicone composition according to the present invention. As to component (D), one kind may be used alone, or two or more kinds may be used in combination.

The average particle diameter of component (D) is 0.01 μm or more and less than 3 μm, preferably 0.01 to 2 μm, more preferably 0.01 to 1 m, and even more preferably within the range of 0.01 to 0.5 μm on a volume basis. If the average particle diameter is within the range, the bulk density of component (D) is easily increased, and the specific surface area is easily decreased, and therefore, component (D) is easily filled highly in the low heat resistance silicone composition according to the present invention. If the average particle diameter is smaller than 0.01 μm, the filling property to a resin is deteriorated, and the viscosity becomes significantly high. If the average particle diameter is 3 μm or more, which is extremely large, oil separation is facilitated.

If the content ratio of coarse particles with 10 μm or more in a laser diffraction-type particle size distribution is 1% by weight or less and preferably 0.2% by weight or less of the entire component (D), component (D) can achieve both of the desired heat resistance and high heat conductivity. If the content ratio of coarse particles with 10 μm or more exceeds 1% by weight of the entire component, the thickness may not become 20 μm or less, and further, the desired heat resistance cannot be achieved. It is noted that the average particle diameter of component (D) and the content ratio of coarse particles are measured in the same manner as explained for component (C).

The shape of component (D) is a spherical and/or irregular shape. In component (D) of the present invention, an irregular shape means those shapes other than spherical. It is not particularly limited as long as the shape does not impair the effects of the present invention even if the shape is, for example, a bar shape, a needle shape, or a disk shape. Component (D) having only a spherical shape or an irregular shape may be used alone, or components (D) having a spherical shape and an irregular shape may be used in combination thereof. The expression "component (D) having a spherical shape" is referred to as component (D) having an average sphericity of preferably 0.8 or more, and more preferably 0.9 or more.

The average sphericity of component (D) can be measured by taking an image of the particle photographed with a scanning electron microscope into an image analyzer, for example, "JSM-7500F" (trade name) manufactured by JEOL Ltd., and by performing as follows. A projection area (X) and a circumference length (Z) of a particle are measured from a photograph of the particle. When the area of a perfect circle corresponding to the circumference length (Z) is taken as (Y), the sphericity of the particle can be expressed as X/Y. Accordingly, when a perfect circle having the same circumference length as the circumference length (Z) of the sample particle is considered, since $Z=2\pi r$, and $Y=\pi r^2$ ("r" is radius), therefore $Y=\pi \times (Z/2\pi)^2$. Then, the sphericity of an individual particle can be calculated as follows: Sphericity=$X/Y=X\times 4\pi/Z^2$. The sphericity of each of the arbitrary 100 particles thus obtained is determined, and the average value is taken as the average sphericity.

The purity of component (D) is preferably 99.5% or more, and from the viewpoint of the impurities of Pb, Cd, and the like, the purity is more preferably 99.8% or more. It is noted that the purity is measured in the same manner as described for component (C).

In the low heat resistance silicone composition according to the present invention, the mixing ratio of (C) the α-aluminum oxide powder, the α-aluminum oxide having a crystal structure of a hexagonal close-packed lattice which is formed of a polyhedron with 8 or more faces, and a particle shape with a D/H ratio of 0.3 to 30 when a maximum particle diameter parallel to a hexagonal lattice face of the hexagonal close-packed lattice is taken as D and a particle diameter perpendicular to the hexagonal lattice face is taken as H, and the α-aluminum oxide powder having an average particle diameter of 0.3 to 5 μm, a content ratio of coarse particles with 10 μm or more in a laser diffraction-type particle size distribution of 1% by weight or less of the entire component (C), and a purity of 99% or more; and (D) the spherical and/or irregular-shaped zinc oxide powder having an average particle diameter of 0.01 μm or more and less than 3 μm, and having a content ratio of coarse particles with 10 μm or more in a laser diffraction-type particle size distribution of 1% by weight or less of the entire component (D) is 5/5 to 9.5/0.5 in terms of weight ratio, and further the mixing ratio is preferably in the range of 6/4 to 9/1 in terms of weight ratio. If the proportion of component (C) is smaller than 5 in terms of weight ratio, the filling property of the filler is deteriorated. In contrast, if the proportion of component (C) is larger than 9.5 in terms of weight ratio, the filler becomes difficult to be densely filled in the composition, and the heat conductivity is decreased.

The total content of the heat conductive fillers of components (C) and (D) in the low heat resistance silicone composition according to the present invention is 65 to 80% by volume and more desirably 70 to 80% by volume of the entire composition. If the content of the heat conductive fillers is less than 65% by volume, the heat conductivity of the silicone composition becomes insufficient, and if the content exceeds 80% by volume, the filling of the heat conductive fillers becomes difficult.

Component (E)

In the composition of the present invention, further a volatile solvent capable of dispersing or dissolving components (A) and (B) in the solvent may be added as component (E). When the composition of the present invention further contains component (F) described later in addition to components (A) and (B), the volatile solvent is preferably one capable of dispersing or dissolving also component (F) in the solvent. Component (E) may be any solvent as long as it can dissolve or disperse components (A) and (B) and optionally component (F). As to component (E), one kind may be used alone, or two or more kinds may be used in combination.

Since the heat conductivity of the heat conductive silicone composition basically correlates with the filling rate of the heat conductive filler, the more the heat conductive filler is filled, the more the heat conductivity is improved. However, as a matter of course, if the filling amount of the heat conductive filler is increased, the viscosity of the heat conductive silicone composition itself tends to be increased, and the dilatancy of the composition tends to be strong when shearing action is applied. Particularly, in screen printing, when squeezing the heat conductive silicone composition, if the heat conductive silicone composition exhibits dilatancy strongly, the fluidity of the heat conductive silicone composition is temporarily strongly suppressed, and therefore, the heat conductive silicone composition cannot pass through the screen mask and the screen mesh, and the coating property may be extremely deteriorated. As described above, conventionally, it has been difficult to arrange a high heat conductive silicone composition in which a heat conductive filler has been highly filled in a heat sink or the like easily, uniformly, and thinly by screen printing. Even if the low heat resistance silicone composition according to the present invention contains the heat conductive fillers of components (C) and (D) at a high filling rate, when the low heat resistance silicone composition contains a volatile solvent of component (E), the viscosity tends to be rapidly lowered and the dilatancy hardly occurs. Therefore, the coating property tends to be favorable, and thus with the low heat resistance silicone composition, a heat sink or the like can be easily coated by screen printing. After coating, component (E) is easily volatilized at ordinary temperature or by heating in a positive manner. Accordingly, in the present invention, a low heat resistance silicone composition in which a heat conductive filler has been highly filled can be arranged in a heat sink or the like easily, uniformly, and thinly by screen printing.

The boiling point of component (E) is preferably within the range of 80 to 260° C. If the boiling point is within this range, component (E) is easily prevented from volatilizing rapidly from the obtained composition during the coating operation of the composition. Therefore, the increase in the viscosity of the composition is easily suppressed. The coating property of the composition is easily sufficiently secured. After the coating operation of the composition, component (E) hardly remains in the composition so that the heat release characteristics are easily improved.

Specific examples of component (E) include toluene, xylene, acetone, methyl ethyl ketone, cyclohexane, n-hexane, n-heptane, butanol, isopropanol (IPA), and an isoparaffin-based solvent. Among them, from the viewpoint of the safety, health, and workability, an isoparaffin-based solvent is preferred. An isoparaffin-based solvent having a boiling point of 80 to 260° C. is more preferred.

When component (E) is added into the composition of the present invention, the amount of component (E) to be added is preferably 100 parts by weight or less and more preferably 75 parts by weight or less per 100 parts by weight of components (A) and (B) combined. If the amount to be added is within the range, it becomes easy to suppress the rapid precipitation of components (C) and (D), and therefore, the storage stability of the composition is easily improved. The lower limit value of the amount of component (E) to be added is not particularly limited, and from the viewpoint of the coating property of the low heat resistance silicone composition according to the present invention, the lower limit value is 1 part by weight or more, and particularly preferably 5 parts by weight or more.

Component (F)

In the composition of the present invention, (F) an alkoxysilane can be further added.

Component (F) is an alkoxysilane represented by the following general formula (3):

$$R^4_d R^5_e Si(OR^6)_{4-d-e} \quad (3)$$

wherein $R^4$ is each independently an alkyl group having 9 to 15 carbon atoms, $R^5$ is each independently an unsubstituted or substituted monovalent hydrocarbon group having 1 to 8 carbon atoms, $R^6$ is each independently an alkyl group having 1 to 6 carbon atoms. d is an integer of 1 to 3, and e is an integer of 0 to 2, provided that d+e is an integer of 1 to 3.

Component (F) is a wetter component, and further an additive agent for preventing the deterioration of component (A) under high temperature and high humidity. By treating surfaces of heat conductive fillers of components (C) and (D) with component (F), wettability of component (A) to components (C) and (D) can be further improved. As a result, component (F) supports the high filling of components (C) and (D). Further, by combining component (F) with component (A), component (F) works so as to suppress the contact between the water vapor and component (A) under high temperature and high humidity. As a result, component (F) prevents the deterioration of the performance of the low heat resistance silicone composition according to the present invention due to the deterioration of component (A) caused by hydrolysis or the like under the condition of high temperature and high humidity. As to component (F), one kind may be used alone, or two or more kinds may be used in combination.

$R^4$ is each independently an alkyl group having 9 to 15 carbon atoms. Specific non-limiting examples of $R^4$ include nonyl, decyl, dodecyl, tetradecyl, and pentadecyl. If the number of carbon atoms is smaller than 9, wettability to heat conductive fillers (components (C) and (D)) tends to be insufficient. If the number of carbon atoms is larger than 15, component (F) is easily solidified at ordinary temperature.

Then, the handling tends to become inconvenient, and further the heat resistance and flame retardancy of the composition to be obtained may be easily lowered.

R is each independently an unsubstituted or substituted and saturated or unsaturated monovalent hydrocarbon group having 1 to 8 carbon atoms. Specific non-limiting examples of $R^5$ include alkyl groups such as methyl, ethyl, propyl, hexyl, and octyl; cycloalkyl groups such as cyclopentyl and cyclohexyl; alkenyl groups such as vinyl and allyl; aryl groups such as phenyl and tolyl; aralkyl groups such as 2-phenylethyl and 2-methyl-2-phenylethyl; halogenated hydrocarbon groups such as 3,3,3-trifluoropropyl, 2-(nonafluorobutyl) ethyl, and p-chlorophenyl or the like. In particular, a methyl or ethyl is preferred.

$R^6$ is each independently an alkyl group having 1 to 6 carbon atoms. Specific non-limiting examples of the $R^6$ include methyl, ethyl, propyl, butyl, pentyl, hexyl, or the like. In particular, methyl and ethyl is preferred.

The subscript "d" is preferably an integer of 1 to 3, and more preferably 1. The subscript "e" is an integer of 0 to 2. Provided that d+e is an integer of 1 to 3.

Illustrative non-limiting examples of component (F) are shown below.

$C_{10}H_{21}Si(OCH_3)_3$,
$C_{10}H_{21}Si(OC_2H_5)_3$,
$C_{12}H_{25}Si(OCH_3)_3$,
$C_{12}H_{25}Si(OC_2H_5)_3$,
$C_{10}H_{21}Si(CH_3)(OCH_3)_2$,
$C_{10}H_{21}Si(C_6H_5)(OCH_3)_2$,
$C_{10}H_{21}Si(CH_3)(OC_2H_5)_2$,
$C_{10}H_{21}Si(CH=CH_2)(OCH_3)_2$, and
$C_{10}H_{21}Si(CH_2CH_2CF_3)(OCH_3)_2$.

When component (F) is added to the composition of the present invention, the amount of component (F) to be added is not limited, but preferably 0.1 to 50 parts by weight, and more preferably 1 to 20 parts by weight per 100 parts by weight of components (A) and (B) combined. If the amount to be added is within the range, the wetter effect and the high temperature and high humidity effect tend to be increased depending on the amount to be added, and this case is economical. On the other hand, since component (F) is somewhat volatile, if the low heat resistance silicone composition containing component (F) is left to stand in an open system, component (F) is evaporated from the composition and the composition may gradually become hard. However, the amount to be added is within the range, such a phenomenon can be easily prevented.

As the treatment method used when components (C) and (D) are surface-treated with component (F), a spraying system using a fluid nozzle, a stirring system with a shear force, a dry method of ball mills, a mixer or the like, or a wet method of water-based, organic solvent-based, or the like can be adopted. In the stirring method, it is important to perform the method to such an extent that the destruction of a spherical aluminum oxide powder does not occur. In the dry method, the system temperature or the drying temperature after treatment is appropriately determined in a range where a surface treatment agent does not volatilize or decompose depending on the type of the surface treatment agent, and is 80 to 180° C. Further, a method in which components (A) and (B) are heated and mixed together with components (C) and (D), and then the obtained mixture is cooled, and into the cooled mixture, component (F) is added can also be adopted.

Other Additive Agents

In the low heat resistance silicone composition according to the present invention, a commonly used additive agent, a filler, and the like can be further added as an optional component within the range of not impairing the effects of the present invention.

Specifically, a fluorine-modified silicone surfactant; carbon black, titanium dioxide, red iron oxide, and the like as a coloring agent; a metal oxide such as a platinum catalyst, iron oxide, titanium oxide, and cerium oxide as a flame retarder; a metal hydroxide; and the like may be added. Further, as a precipitation preventing agent of a heat conductive filler at the time of high temperature, fine powder silica such as precipitated silica, and calcined silica, a thixotropic agent, and the like are optionally added.

Preparation of Composition

The low heat resistance silicone composition according to the present invention is prepared by mixing components described above using a mixer such as a dough mixer (kneader), a gate mixer, or a planetary mixer. The composition thus obtained has a significant improvement in the heat conductivity, and has favorable workability, durability, and reliability.

Heat Conductivity

The heat conductivity at 25° C. of the low heat resistance silicone composition according to the present invention is 2 W/m·K or more and less than 4 W/m·K, and preferably 2.5 to 3.5 W/m·K as measured by a hot disk method in accordance with ISO 22007-2.

If the heat conductivity is smaller than this range, the heat characteristics of the heat generating electronic component to be desired are deteriorated. If the heat conductivity is extremely large, the coating property of the composition becomes difficult. The heat conductivity of the composition in the present invention can be measured, for example, by using "TPS 2500 S" (trade name) manufactured by KYOTO ELECTRONICS MANUFACTURING CO., LTD.

Viscosity

The viscosity at 25° C. of the low heat resistance silicone composition according to the present invention is 5 to 800 Pa·s, preferably 5 to 750 Pa·s or less, and more preferably 5 to 500 Pa·s or less as measured by a spiral viscometer at a rotation speed of 10 rpm. If the viscosity is within this range, since the resulting composition tends to have favorable fluidity, and therefore, the workability such as a dispensing property, or a screen printing property is easily improved, and thus with the composition, a substrate becomes easy to be thinly coated. The viscosity of the composition of the present invention can be measured by using, for example, "type PC-10AA" (trade name) manufactured by Malcolm Co., Ltd.

In the low heat resistance silicone composition according to the present invention, after the composition has been heat-deteriorated at 200° C. for 100 hours by using a dryer, the viscosity measured at 25° C. in a similar manner as in the above is preferably 1,000 Pa·s or less, more preferably 700 Pa·s or less, and even more preferably 500 Pa·s or less. The reliability of a heat generating electronic component can be secured by being such a non-curing type and having the thixotropy.

Heat Resistance

The heat resistance at 25° C. of the low heat resistance silicone composition according to the present invention measured by a laser flash method is preferably 6 mm$^2$·K/W or less, and more preferably 5 mm$^2$·K/W or less.

In the low heat resistance silicone composition according to the present invention, after the composition has been left to stand for 96 hours under an atmosphere of 130° C./85% RH, the heat resistance at 25° C. as measured by a laser flash method is preferably 6 mm$^2$·K/W or less, and particularly preferably 5 mm$^2$·K/W or less. If the heat resistance is within this range, even when the composition of the present invention is applied to a heating element having a large calorific value, the heat generated from the heating element can be efficiently dissipated to a heat releasing component. It is noted that the measurement of the heat resistance by a laser flash method can be performed in accordance with ASTM E 1461.

Volume Resistivity

In the low heat resistance silicone composition according to the present invention, the volume resistivity measured by a method in accordance with JIS K 6911 is preferably $1 \times 10^9$ Ω·cm or more, and more preferably $1 \times 10^{10}$ Ω·cm or more. Within such a range, the composition of the present invention can secure the insulation.

Application of Composition

With the low heat resistance silicone composition according to the present invention, a heating element, or a heat dissipator is coated. Examples of the heating element include a general power supply; an electronic device such as a power transistor for power supply, a power module, a thermistor, a thermocouple, and a temperature sensor; and a heat generating electronic component of an integrated circuit device such as LSI, and CPU, or the like. Examples of the heat dissipator include a heat releasing component such as a heat spreader, and a heat sink; a heat pipe, and a heat sink. The coating can be performed, for example, by screen printing. The screen printing can be performed, for example, by using a metal mask, or a screen mesh. By interposing and coating with the composition of the present invention between a heating element and a heat dissipator, the heat can be efficiently conducted from the heating element to the heat dissipator, and therefore, the heat can be efficiently removed from the heating element.

EXAMPLES

Examples of the invention are given below by way of illustration and not by way of limitation.

Examples 1 to 5, and Comparative Examples 1 to 5

Following components were used to prepare the compositions.

(A) Organopolysiloxane Having an Alkoxy Group Bonded to a Silicon Atom

A-1: Organopolysiloxane having a kinematic viscosity of 30 mm$^2$/s and to represented by the following formula

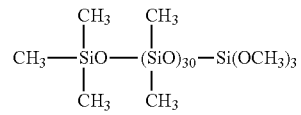

(B) Organopolysiloxane
 B-1: Organopolysiloxane having a kinematic viscosity of 500 mm²/s and represented by the following formula

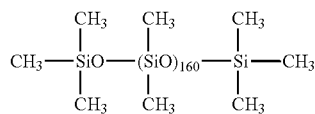

(C) Aluminum Oxide Powder

TABLE 1

| Kind | Average particle diameter (μm) | Crystal shape | D/H | Purity (%) | Content of coarse particles (% by weight) |
|---|---|---|---|---|---|
| C-1 | 3.5 | Polyhedral shape (mixture of 8 faces and 16 faces), hexagonal close-packed lattice | 0.8 | 99.99 | 0.3 |
| C-2 | 0.48 | Polyhedral shape (mixture of 8 faces and 16 faces), hexagonal close-packed lattice | 1.0 | 99.99 | 0 |
| C-3 (Comparative Component) | 4.1 | Polyhedral shape (mixture of 8 faces and 16 faces), hexagonal close-packed lattice | 0.8 | 99.99 | 1.3 |
| C-4 (Comparative Component) | 5.5 | Polyhedral shape (mixture of 8 faces and 16 faces), hexagonal close-packed lattice | 1.5 | 99.99 | 0.8 |
| C-5 (Comparative Component) | 0.25 | Polyhedral shape (mixture of 8 faces and 16 faces), hexagonal close-packed lattice | 1.3 | 99.99 | 0 |
| C-6 (Comparative Component) | 3.2 | Spherical shape | — | 99.94 | 0.5 |
| C-7 (Comparative Component) | 4.2 | Spherical shape | — | 99.88 | 1.9 |

It is noted that the average particle diameter shown here was calculated from the entire particle size distribution obtained by a laser diffraction-type particle size distribution. The content of coarse particles is a content ratio of coarse particles with 10 μm or more to the particle size distribution obtained by a laser diffraction-type particle size distribution.

(D) Zinc Oxide Powder (D-1) Irregular-Shaped Zinc Oxide Powder (Having an Average Particle Diameter of 0.27 μm, and a Content of Coarse Particles with 10 μm or More of 0.1% by Weight)

The average particle diameter shown here was calculated from the entire particle size distribution obtained by a laser diffraction-type particle size distribution. The content of coarse particles is a content ratio of coarse particles with 10 μm to the particle size distribution obtained by a laser diffraction-type particle size distribution.

(E) Volatile Solvent Capable of Dispersing or Dissolving Components (A-1), (B-1) and (F-1) in the Solvent
 E-1: ISOSOL™ 400 (trade name, an isoparaffin-based solvent, having a boiling point of 210 to 254° C., manufactured by Nippon Petrochemicals Co., Ltd.)

(F) Alkoxysilane
 F-1: Alkoxysilane represented by the following formula

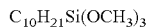

Production Method

Components (A) to (D) and optionally components (E) and (F) were mixed as follows to obtain the compositions of Examples 1 to 5 and Comparative Examples 1 to 5. That is, components (A) to (D) each were weighed out in a 5-liter planetary mixer (manufactured by INOUE MFG., INC.) at the composition ratio (parts by weight) shown in Table 2, and mixed under reduced pressure and the conditions of 150° C. for 1 hour and 30 mmHg or less. After that, the obtained mixture was cooled and mixed until the temperature reached an ordinary temperature. When components (E) and (F) were added, components (E) and (F) each were added to the cooled mixture in the amounts shown in Table 2 and mixed so that the resultant mixture was made to be uniform.

Test Method

The properties of the obtained composition were measured by the following test method. The results are shown in Table 2.

Viscosity Measurement

The obtained composition was left to stand in a thermostatic chamber at 25° C. for 24 hours, and then the viscosity at a rotation speed of 10 rpm was measured by using a viscometer (trade name: spiral viscometer PC-10AA manufactured by Malcolm Co., Ltd).

Viscosity Measurement after Heat Deterioration

After allowing the obtained composition to be heat deteriorated at 200° C. for 100 hours by using a dryer, the heat-deteriorated composition was left to stand in a thermostatic chamber at 25° C. for 24 hours, and then the viscosity was measured in a similar manner as in the above.

Measurement of Heat Conductivity

Two pieces of the obtained composition wrapped in plastic wrap for use in a kitchen so as to keep out bubbles and the like were prepared, and the sample was sandwiched in a sensor of a heat conductivity meter (trade name: TPS-2500 S) manufactured by Kyoto Electronics Manufacturing Co., Ltd., and the heat conductivity of the composition at 25° C. was measured.

Measurement of Volume Resistivity

In order to perform the measurement by a double ring electrode method on the basis of JIS K 6911, a test piece was prepared so as to have a sample thickness of 1 mm, 500 V was applied between the electrodes, and the volume resistivity after the lapse of 1 minute was measured.

Preparation of Test Piece for Measuring Thickness and Heat Resistance

The composition having a thickness of 40 xm was sandwiched between two circular aluminum plates each having a diameter of 12.6 mm and a thickness of 1 mm, and a test piece was prepared by applying a pressure of 0.15 MPa at 25° C. for 60 minutes.

Measurement of Thickness

The thickness of the test piece was measured with a micrometer (manufactured by Mitutoyo Corporation), and the thickness of the composition was calculated by subtracting the thickness of two aluminum plates that had measured in advance.

Measurement of Heat Resistance

By using the above-described test piece, the heat resistance (unit: mm²·K/W) of the composition was measured at 25° C. by a heat resistance measuring instrument (xenon flash analyzer, LFA447 NanoFlash manufactured by NETZSCH-Geratebau GmbH) based on a laser flash method.

Measurement of Heat Resistance after being Left to Stand Under High Temperature and High Humidity The above-described test piece after the heat resistance measurement was left to stand for 96 hours under an atmosphere of 130° C./85% RH, and then the heat resistance (unit: mm²·K/W) of the composition was measured again by the same heat resistance measuring instrument.

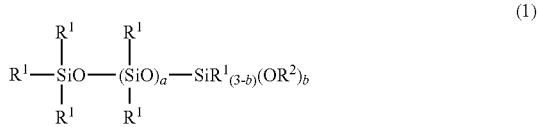

wherein $R^1$ is each independently an unsubstituted or substituted monovalent hydrocarbon group having 1 to 18 carbon atoms, $R^2$ is each independently alkyl, alkoxyalkyl, alkenyl, or acyl, a is an integer of 5 to 100, and b is an integer of 1 to 3;

TABLE 2

| Mixing amount (parts by weight) | Example | | | | | Comparative Example | | | | |
|---|---|---|---|---|---|---|---|---|---|---|
| | 1 | 2 | 3 | 4 | 5 | 1 | 2 | 3 | 4 | 5 |
| A-1 | 30 | 30 | 30 | 30 | 70 | 30 | 30 | 70 | 30 | 30 |
| B-1 | 70 | 70 | 70 | 70 | 30 | 70 | 70 | 30 | 70 | 70 |
| C-1 | 1,050 | 1,058 | 1,050 | 1,050 | 630 | | | | | |
| C-2 | | 118 | | | | | | | | |
| C-3 | | | | | | 1,050 | | | | |
| C-4 | | | | | | | 1,050 | | | |
| C-5 | | | | | | | | 630 | | |
| C-6 | | | | | | | | | 1,050 | |
| C-7 | | | | | | | | | | 1,050 |
| D-1 | 300 | 336 | 300 | 300 | 180 | 300 | 300 | 180 | 300 | 300 |
| E-1 | | | 15 | 15 | | | | | | |
| F-1 | | | | 1 | | | | | | |
| Filler volume (% by volume) | 76.0 | 78.0 | 72.7 | 72.5 | 65.5 | 76.0 | 76.0 | 65.5 | 76.0 | 76.0 |
| C/D weight ratio | 7.78/2.22 | 7.78/2.22 | 7.78/2.22 | 7.78/2.22 | 7.78/2.22 | 7.78/2.22 | 7.78/2.22 | 7.78/2.22 | 7.78/2.22 | 7.78/2.22 |
| Viscosity (Pa · s) | 446 | 691 | 77 | 69 | 215 | 413 | 401 | 812 | 756 | 648 |
| Viscosity after 200° C. for 100 h (Pa · s) | 461 | 779 | 298 | 279 | 229 | 428 | 424 | Unmeasurable | Unmeasurable | 779 |
| Heat conductivity (W/m · K) | 3.4 | 3.6 | 2.7 | 2.6 | 2.2 | 3.5 | 3.6 | 2.1 | 3.2 | 3.7 |
| Volume resistivity (Ω · cm) | $2.4 \times 10^{10}$ | $2.9 \times 10^{10}$ | $3.8 \times 10^{10}$ | $4.1 \times 10^{10}$ | $8.9 \times 10^{10}$ | $3.7 \times 10^{10}$ | $2.5 \times 10^{10}$ | $5.5 \times 10^{10}$ | $2.9 \times 10^{10}$ | $2.7 \times 10^{10}$ |
| Thickness (μm) | 12 | 12 | 10 | 10 | 11 | 20 | 13 | 8 | 11 | 21 |
| Heat resistance of composition (mm² · K/W) | 3.5 | 3.3 | 3.7 | 3.9 | 4.5 | 5.7 | 3.6 | 3.6 | 3.5 | 5.3 |
| Heat resistance after left to stand under high temperature and high humidity (mm² · K/W) | 3.8 | 3.8 | 4.1 | 4.4 | 4.9 | 6.3 | 6.1 | 4.2 | 4.3 | 6.2 |

Japanese Patent Application No. 2018-104399 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A low heat resistance silicone composition, comprising:

(A) 5 to 99 parts by weight of an organopolysiloxane having a kinematic viscosity at 25° C. of 10 to 10,000 mm²/s and represented by the following general formula (1):

(B) 95 to 1 part by weight of an organopolysiloxane having a kinematic viscosity at 25° C. of 10 to 100,000 mm²/s and represented by the following general formula (2):

wherein $R^3$ is each independently an unsubstituted or substituted monovalent hydrocarbon group having 1 to 18 carbon atoms, and c is a number of 1.8 to 2.2, provided that the total amount of components (A) and (B) combined is 100 parts by weight;

(C) an α-aluminum oxide powder, the α-aluminum oxide having a crystal structure of a hexagonal close-packed lattice which is formed of a polyhedron with 8 or more faces, and a particle shape with a D/H ratio of 0.3 to 30 when a maximum particle diameter parallel to a hexagonal lattice face of the hexagonal close-packed lattice is taken as D and a particle diameter perpendicular to the hexagonal lattice face is taken as H, and the α-aluminum oxide powder having an average particle diameter of 0.3 to 5 μm, a content ratio of coarse particles with 10 μm or more in a laser diffraction-type particle size distribution of 1% by weight or less of the entire component (C), and a purity of 99% or more; and (D) a spherical and/or irregular-shaped zinc oxide powder having an average particle diameter of 0.01 μm or more and less than 3 μm, and a content ratio of coarse particles with 10 μm or more in a laser diffraction-type particle size distribution of 1% by weight or less of the entire component (D), provided that a weight ratio of component (C) and component (D) is 5/5 to 9.5/0.5, and the total amount of components (C) and (D) combined is 65 to 80% by volume of the entire composition, the composition having a heat conductivity of 2 W/m·K or more and less than 4 W/m·K as measured by a hot disk method in accordance with ISO 22007-2, and a viscosity at 25° C. of 5 to 800 Pa·s as measured by a spiral viscometer at a rotation speed of 10 rpm.

2. The low heat resistance silicone composition according to claim 1 which has a heat resistance at 25° C. as measured by a laser flash method of 6 mm²·K/W or less.

3. The low heat resistance silicone composition according to claim 1 which has a heat resistance at 25° C. as measured by a laser flash method of 6 mm²·K/W or less after the composition is left to stand for 96 hours under an atmosphere of 130° C./85% RH.

4. The low heat resistance silicone composition according to claim 1 which has a viscosity at 25° C. of 1,000 Pa·s or less as measured by a spiral viscometer at a rotation speed of 10 rpm after the composition is heat-deteriorated at 200° C. for 100 hours.

5. The low heat resistance silicone composition according to claim 1, further comprising:

component (E) of a volatile solvent capable of dispersing or dissolving components (A) and (B) in the solvent, in an amount of 100 parts by weight or less per 100 parts by weight of the total amount of components (A) and (B) combined.

6. The low heat resistance silicone composition according to claim 1, further comprising:

(F) an alkoxysilane represented by the following general formula (3):

$$R^4_d R^5_e Si(OR^6)_{4-d-e} \qquad (3)$$

wherein $R^4$ is each independently an alkyl group having 9 to 15 carbon atoms, $R^5$ is each independently an unsubstituted or substituted monovalent hydrocarbon group having 1 to 8 carbon atoms, $R^6$ is each independently an alkyl group having 1 to 6 carbon atoms, d is an integer of 1 to 3, and e is an integer of 0 to 2, provided that d+e is an integer of 1 to 3, in an amount of 0.1 to 50 parts by weight per 100 parts by weight of the total amount of components (A) and (B) combined, wherein components (C) and (D) are surface-treated with component (F).

7. The low heat resistance silicone composition according to claim 1 which has a volume resistivity of $1 \times 10^9$ Ω·cm or more.

* * * * *